United States Patent [19]

Helmstetter

[11] Patent Number: 4,994,113

[45] Date of Patent: Feb. 19, 1991

[54] MIXTURE FOR THE PREPARATION OF BUILDING MATERIALS

[75] Inventor: John G. Helmstetter, Brick, N.J.

[73] Assignee: Core-Guard Industries, Inc., Lavalette, N.J.

[21] Appl. No.: 480,488

[22] Filed: Feb. 6, 1990

[51] Int. Cl.$^5$ .................... C04B 12/04; C04B 16/02; C04B 18/24

[52] U.S. Cl. .................. 106/618; 106/18.12; 106/18.13; 106/619; 106/634; 106/635; 156/39; 156/44; 156/45

[58] Field of Search ............... 106/18.12, 18.13, 81, 106/82, 618, 619, 634, 635; 156/39, 44, 45

[56] References Cited

U.S. PATENT DOCUMENTS 4,076,580 2/1978 Panusch et al. .................. 106/18.12
4,297,252 10/1981 Caesar et al. .................... 106/18.12

FOREIGN PATENT DOCUMENTS 2378076 9/1978 France .............................. 106/18.12
2041384 9/1980 United Kingdom ................. 106/81

*Primary Examiner*—Mark L. Bell
*Assistant Examiner*—Anthony J. Green
*Attorney, Agent, or Firm*—Stephen W. White

[57] ABSTRACT

A mixture of waste, essentially cellulosic material and a fire proofing solution can be used to make building materials with exceptional qualities. These qualities include fire proofing, vermin proofing, water proofing and excellent insulative values, for example. Additionally, this process represents an excellent method for recycle of these waste materials. A sheetrock-like or wall-board material can be made therefrom, one which can be nailed, screwed, drilled and fastened without causing serious damage to the surface or the element itself.

3 Claims, No Drawings

MIXTURE FOR THE PREPARATION OF BUILDING MATERIALS

BACKGROUND OF THE INVENTION

1. Field of the Invention

This invention relates to a mixture that can be used for the manufacture of building materials such as wallboard and the like and to the composition thereof. More specifically, this invention also relates to the manufacture of wall-board from recovered, waste, essentially cellulosic material. Still more particularly, this invention relates to novel wallboard compositions that are fireproof, vermin free and insulative in nature.

2. Discussion of the Prior Art

Wall-board, a material of construction and also called "sheetrock", is generally manufactured by the compression of gypsum or other cementitious material between heavy cardboard or paper. This material is conventionally and commonly used in the building trades to form the first layer inside of a building. It may be conventionally installed over standard wooden or metal uprights to form the inside walls of a building, for example. Installation is generally accomplished by nailing the sheetrock to the uprights, or "studs", or by screws or other conventional fastening devices. Finish may be the be applied in the form of spackling, or by painting or by the installation of wallpaper on the surface thereof or any combinations thereof. In between the studs, it is conventional to place insulation, especially if the wall is an outside of the building, since sheetrock itself has little or no insulative value. The problem with conventional sheetrock is that it is usually not fireproof and breaks easily during handling and the fastening steps mentioned above. For example, when sheetrock is nailed along the edges, the gypsum crumbles since it is relatively fragile. Thus, the defects caused by this crumbling must be covered prior to the application of finishes thereon. Additionally, as mentioned above, gypsum-type sheetrock has very little insulative value and is not fireproof per se, unless treated according to U.S. Pat. No. 4,886,548, for example or by other procedures as taught therein.

There is also a pressing need to recycle waste materials generated by industrial or household sites. These waste materials are mainly cellulosic in nature coming from paper, paper products and other cellulosic wastes. These wastes make up the bulk of the common waste stream in our society and are generally discarded by land-filling. However, the conventional methods of disposal are no longer acceptable and thus the need to recycle these products into some other useful material.

SUMMARY OF THE INVENTION

It has been a long, sought-after goal to provide a material which can be used in the manufacture of fireproof, vermin proof, insulative and more utile wallboard for use in buildings, for example. Additionally, there is a long-standing need to utilize waste material now discarded and becoming a serious problem for the environment. These and yet other objects and needs are provided by a mixture comprising, based on 100 total parts by weight of the mixture, an admixture of 80 to 40 parts by weight of waste material consisting essentially of cellulosic waste and 20 to 60 parts by weight of an equal mixture of the following two part solution:

Part A, the first part comprising an equal mixture of three liquid silicates of varying viscosities with the following composition:

(a) a solution of about 8.9% $Na_2O$ and about 28.7% $SiO_2$ and having a specific gravity of between 35°–40° Baume;

(b) a solution of about 11.0% $Na_2O$ and about 31.7% $SiO_2$ and having a specific gravity of between 40°–50° Baume; and, (c) a solution of about 8.3% $K_2O$ and about 20.8% $SiO_2$ and having a specific gravity of between 65°–85° Baume;

and Part B, the second part comprising an aqueous mixture of equal amounts of acetic acid, borax, kaolin, zinc oxide and sodium bicarbonate.

DETAILED DESCRIPTION OF THE INVENTION

By the term "essentially cellulosic waste materials" I mean those waste materials wherein cellulosic products make up at least one half of the total contents thereof and more specifically wherein about 80% of said waste has its' origins from cellulose. Other waste materials such as small amounts of plastics and/or other materials make up a minority portion of this waste stream. These materials include, among others, paper, cardboard, leaves, grasses, paper products such as newspapers, milk cartons, boxes and many other products too numerous to mention and well-known to those of skill in the art of waste removal and recovery. A plurality of these products are discarded daily by almost every household in society and by most industrial sites. These materials make up the largest volume of the waste stream and are usually discarded to land-fills. At these land-fill sites, the waste streams are generally buried and copious amounts of earth placed over the discarded material. Since air and water is thus excluded, many of these products do not degrade but simply sit there for years. There are many methods of recycle for many of the paper products, for example, but these are sometimes not cost effective. Thus, there is a pressing need to recover these valuable resources and to cease the ground pollution from land-fill operations.

There are methods for treating this waste material so as to better utilize the product in other ways. It is known to grind and shred the entire waste stream into very small, fibrous-like material and then to disinfect this material using heat or chemical treatment. The resulting materials have been slurried in water and then pressed into various units such as simple, board-like materials for various uses and as ceiling tiles, etc. The trouble with these materials is that they are still made from paper and other cellulosic material and thus are highly flammable. By mixing this waste material with a unique fire proofing material as described herein, a strong, utile, insulative, vermin proof, water proof and smooth filler that can be used in the manufacture of wall-board like products, for example, is obtained.

In the preparation of the solution of this invention, I first make up a mixture of the liquid silicates of varying viscosities (called Part A). These ingredients are stirred thoroughly to insure that a blend the silicates is obtained. The ingredients of the second mixture (called Part B) is made by mixing equal parts of acetic acid (which is added to enhance curing of the mixture), borax (which is also added to enhance curing ), kaolin or clay (which is added to give the mixture body and texture), zinc oxide (which is added to impart water proofing tendencies), and sodium bicarbonate (which is added to improve agitation and mixing) to water. It is necessary to heat Part B to a temperature of 150° F. or more in order to properly obtain the requisite mixing both of Part B and with Part B into Part A. After mixing both Parts, I prefer allowing the mixture to partially cure at about 100° F. for about 90 seconds to 1 minute before mixing with the waste, cellulosic material. About 80 parts of waste, cellulosic material and about 20 parts of the aforesaid mixture can be mixed together. Preferably, 60 parts of the waste and 40 parts of the mixture are used. These are thoroughly admixed to a uniform, paste-like consistency.

To manufacture a wall-board, for example, the mixture of waste material and fire proofing solution or mixture described above, may be slightly cured at an elevated temperature for about 1 minute, for example, and then is poured onto a heavy sheet of cardboard such as that used in the manufacture of conventional sheetrock, for example. Sufficient mixture is poured so as to make the requisite thickness of wall-board. Then, a second, topcoat layer of heavy paper or cardboard, is laid thereon, and this element is then compressed by passing through rollers at about 50–120 psi pressure, for a short period of time (5–30 seconds), for example. During this period of time, the mixture of waste, essentially cellulosic material and the fire proofing composition is further curing to a hard, firm consistency. The entire reaction is then completed by heating the wall-board to further cure the mixture at about 100°–150° F. When this final curing step is complete, the resulting wall-board or other product made thereby, can be cut into the desired sizes and shapes, if so desired, and the edges treated in a conventional manner such as by the application of a conventional paper tape or in some other desirable manner.

Most of the ingredients of my novel, fireproofing solution are readily obtainable in the prior art and from commercial sources. The liquid silicate mixtures are also commercially obtainable. For example, these can be purchased from The PQ Corporation of Valley Forge, Pa. and are termed "PQ® Soluble Silicates, Type SS-N®, Type SS-C® and Type Kasil®-1, for example. They are conventional, syrupy-like liquids, soluble in water.

In addition to the aforesaid ingredients, which are necessary to impart fire-resistance as stated, certain other ingredients may be added for other purposes. For example, formamide may be added to thin the solution out and glycols such as ethylene glycol acetate and glycerol mono-, di- and triacetates added to impart a resistance to freezing. This is particularly needed when the solutions of this invention are to be applied in colder climate or under adverse, freezing conditions. Various salts such as calcium or sodium chloride may be added to increase the requisite temperature range at which this solution may be used. In order to increase the surface tension, magnesium or aluminium sulfates or polyvinyl acetates may be added thereto. Hydrogen peroxide may be added to bleach colorants that may be present such as titanium dioxide or aluminum pigments. Preservatives such as urea formaldehyde may also be included. The aforesaid ingredients are not a requisite part of the solution but may be only added if required to perform some other task. All of this is fully described in the aforementioned patent, the sum and substance of which is incorporated herein by reference.

A particularly preferred mixture of ingredients to achieve a solution to mix with the aforesaid waste, essentially cellulosic material, is as follows:

Part A: (by weight)

One (1) part (24 oz.) PQ SS-N ®
One (1) part (12 oz.) PQ SS-C ®
One (1) part (12 oz.) PQ K ®-1

These ingredients were stirred thoroughly to insure intimate mixing.

Part B: (by weight)

Six (6) parts (48 oz.) water
2 oz. each of the following ingredients:
Acetic Acid
Borax
Kaolin
Zinc Oxide
Sodium Bicarbonate These ingredients were mixed thoroughly at 150° F. for about 8–10 min. Then, Part B was added to Part A and stirred to mix thoroughly.

Part B represents an important part of this novel fireproofing solution of this invention since it is imperative to achieve stability and increase the shelf-life. Equal parts of each ingredient are required, though the level in amount by weight may vary from 1 to 16 oz. Satisfactory results have thus been achieved over a wide range of these ingredients. Each ingredient plays an important role in the mixture and adds value as described above.

As previously mentioned, I can employ up to 80 parts by weight of the waste, essentially cellulosic material. As little as 40 parts by weight of this material can also be used within the metes and bounds of my invention. However, at a low level of waste material, more curing of the mixture is required. Additionally, the resulting element will begin to increase in weight as more and more of the fire proofing material is added thereto. And, since this last material is more costly, it is efficacious to employ about 60 parts by weight of the waste material and about 40 parts by weight of the fire proofing material in order to obtain a highly useful product therefrom.

A sheetrock-like wall-board made using the mixture of my invention and by the aforementioned process, will produce a high quality product. The wall-board is extremely fire proof, water proof and vermin-proof. Additionally, and very surprisingly, the board has excellent stability, is of a comparable weight to conventional sheetrock, can be nailed, screwed, glued and drilled and otherwise fastened by conventional means without damage thereto and is has almost twice the insulative value of conventional sheetrock. These findings were surprising indeed since it was not heretofor known that a mixture of waste, essentially cellulosic material would produce so stable an element. Since one can now easily utilize waste material in this manner, the process presents considerable advantages in the recycle of waste streams, for example.

I claim:

1. A mixture suitable for use in the manufacture of building materials comprising, based on 100 total parts by weight of the mixture, an admixture of 80 to 40 parts by weight of waste material consisting essentially of cellulosic waste and 20 to 60 parts by weight of an equal mixture of the following two parts solution:

Part A, the first part comprising a mixture of three liquid silicates of varying viscosities with the following composition:
(a) 50% by weight of a solution of about 8.9% $Na_2O$ and about 28.7% $SiO_2$ and having a specific gravity of between 35°–40° Baume;
(b) 25% by weight of a solution of about 11.0% $Na_2O$ and about 31.7% $SiO_2$ and having a specific gravity of between 40°–50° Baume; and
(c) 25% by weight of a solution of about 8.3% $K_2O$ and about 20.8% $SiO_2$ and having a specific gravity of between 65°–85° Baume;
and Part B, the second part comprising an aqueous mixture of equal amounts of acetic acid, borax, kaolin, zinc oxide and sodium bicarbonate.

2. The mixture according to claim 1 wherein 60 parts by weight of said waste material is mixed with 40 parts by weight of said two part solution, wherein the ingredients of said two part solution are present in the following amounts by weight:
Part A:
(a) 24 oz;
(b) 12 oz; and;
(c) 12 oz;
and Part B comprises 2 oz. each of acetic acid, borax, kaolin, zinc oxide and sodium bicarbonate dissolved in water to make 48 oz.

3. A process for the manufacture of wall-board comprising making a mixture of 60 parts waste, cellulosic material and 40 parts of an equal mixture of the following two part solution:
Part A:
(a) 50% by weight of a solution of about 8.9% $Na_2O$ and about 28.7% $SiO_2$ and having a specific gravity of between 35°–40° Baume;
(b) 25% by weight of a solution of about 11.0% $Na_2O$ and about 31.7% $SiO_2$ and having a specific gravity of between 40°–50° Baume; and,
(c) 25% by weight of a solution of about 8.3% $K_2O$ and about 20.8% $SiO_2$ and having a specific gravity of between 65°–85° Baume;
and Part B, the second part, comprising an aqueous mixture of equal amounts of acetic acid, borax, kaolin, zinc oxide and sodium bicarbonate, and coating said mixture of solutions and waste material to one surface of a sheet of cardboard, applying a second sheet of cardboard over said coating to obtain an element comprising a sandwich of mixture coated between cardboard sheets, pressing said sandwich at 50 to 120 psi for about 30 seconds, followed by curing said sandwich at about 100° to 150° F.

* * * * *